United States Patent [19]

Rogers

[11] Patent Number: 4,540,021
[45] Date of Patent: Sep. 10, 1985

[54] BALANCED VALVE COUPLING

[75] Inventor: Russell L. Rogers, Munith, Mich.

[73] Assignee: Aeroquip Corporation, Jackson, Mich.

[21] Appl. No.: 591,808

[22] Filed: Mar. 21, 1984

[51] Int. Cl.³ .................. F16L 37/28; F16L 37/22
[52] U.S. Cl. ...................... 137/614.05; 137/614.06
[58] Field of Search ............... 137/614.05, 614.06; 285/306, 312, 316

[56] References Cited

U.S. PATENT DOCUMENTS

| | | | |
|---|---|---|---|
| 2,463,326 | 3/1949 | Smisko et al. | 137/614.03 |
| 3,215,161 | 11/1965 | Goodwin et al. | 137/614.04 |
| 3,291,152 | 12/1966 | Comer | 137/614.04 |
| 3,348,575 | 10/1967 | Simok | 137/614.05 |
| 3,431,942 | 3/1969 | Kopasha | 137/614.05 |
| 3,507,523 | 4/1970 | Cadley | 285/316 X |
| 3,646,964 | 3/1972 | Stratzman | 137/614.05 X |
| 3,710,823 | 1/1973 | Vik | 285/316 X |
| 3,730,221 | 5/1973 | Vik | 137/614.04 X |
| 4,009,729 | 3/1977 | Vik | 137/614.05 |
| 4,213,482 | 7/1980 | Gondek | 137/614.05 X |
| 4,222,411 | 9/1980 | Herzan et al. | 137/614.04 |
| 4,303,098 | 12/1981 | Shindelar | 137/614.05 X |

Primary Examiner—A. Michael Chambers
Assistant Examiner—John C. Fox

[57] ABSTRACT

A fluid coupling for pressurized hydraulic systems permitting the interconnection of coupling parts even while both parts are pressurized. The coupling includes interconnectable parts employing self-sealing valves, and a manually operated lever axially translates an interlock to couple the parts. An expansible motor assists coupling, and a second expansible motor feature utilizes supply pressurized fluid to displace the valve of the supplied part although the same is under pressure during coupling. The coupling is of the "break-away" type wherein the parts uncouple under predetermined axial tension, and the self-sealing valves will not check under high flow rates.

4 Claims, 4 Drawing Figures

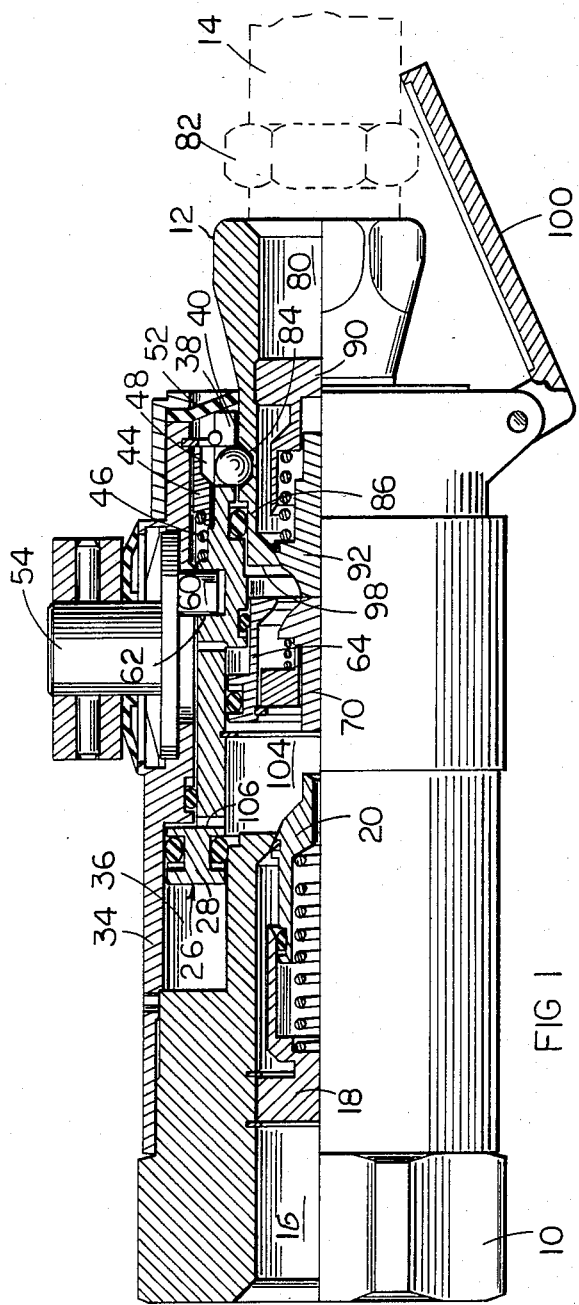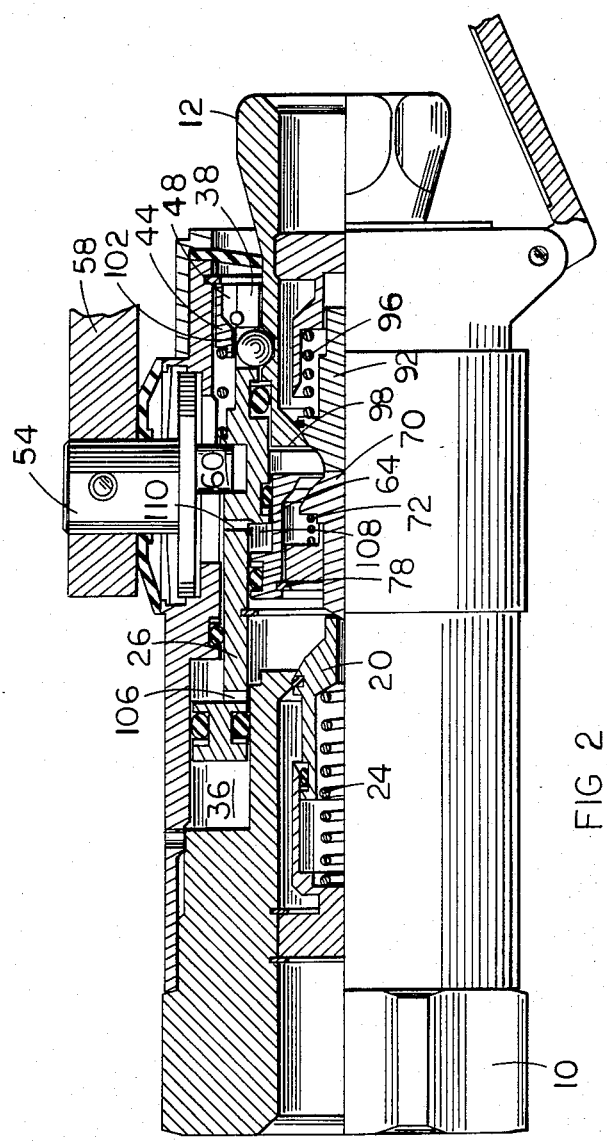
FIG 1
FIG 2

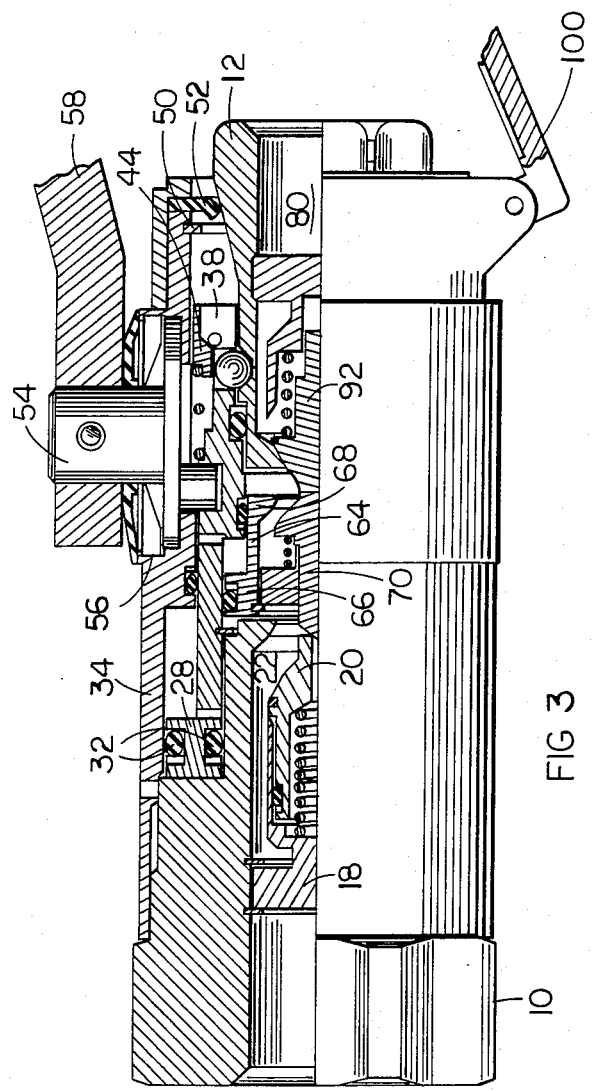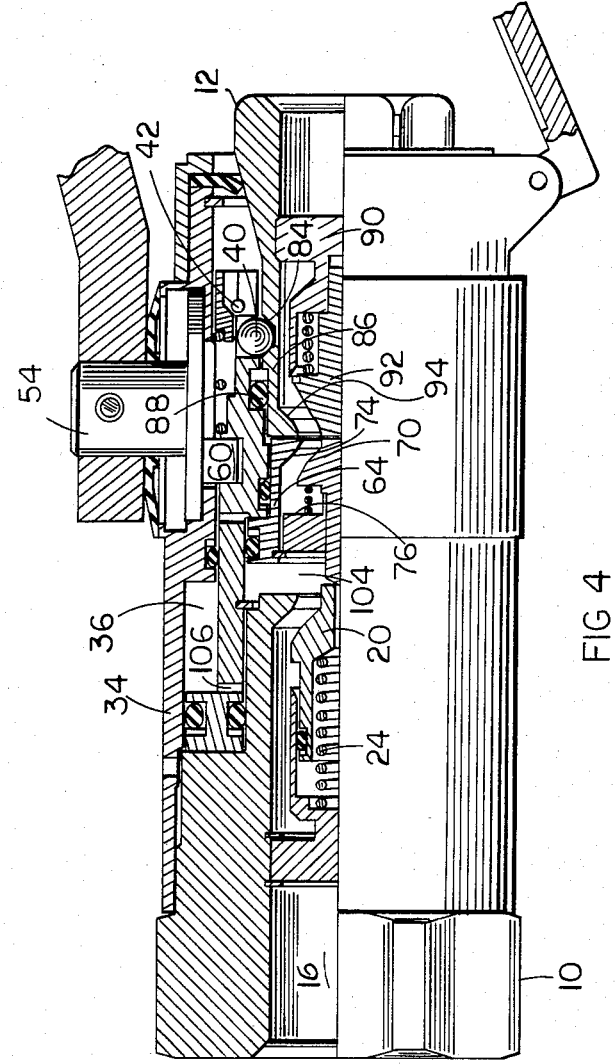

4,540,021

BALANCED VALVE COUPLING

BACKGROUND OF THE INVENTION

Couplings with self-sealing valves are commonly utilized in fluid circuits to prevent the escape of fluid when the parts are uncoupled. Such self-closing valves are usually spring biased, and are located within the coupling part adjacent the end thereof whereby the valves of the parts engage during coupling to displace each other and open the part passages. Such self-sealing couplings are easily connected if the fluid pressure within a part, or parts, is nil or low, but internal pressure renders coupling of self-sealing parts difficult if the internal fluid pressure must be overcome to displace the valves and permit complete interlocking of the parts.

Fluid couplings used with agricultural equipment must be readily coupled and uncoupled, self-sealing, and of the "breakaway" type wherein the coupling parts automatically separate when the axial tension in the hose lines reaches a predetermined force, as will happen if the implement being towed by the tractor is inadvertently dehitched, or the hitch trips because the implement strikes an immovable object.

Also, with agricultural hydraulic systems it is not uncommon for high pressures to exist within the supplied implement circuit wherein fluid pressure is produced by the weight of the implement hydraulically-operated components. In such instances the pressure within the implement circuit renders interlocking of the coupling parts difficult due to the implement pressure and the supply pressure at the tractor.

Available hydraulic fittings for agricultural systems have not successfully overcome the aforementioned problems, and it is the purpose of the invention to provide a fluid fitting which is capable of overcoming the aforedescribed situations.

It is an object of the invention to provide a fluid coupling which is of the "breakaway" type utilizing self-sealing valves but is capable of transmitting and operating at high fluid pressures, and wherein the valves do not inadvertently close or check due to high volume flow.

Another object of the invention is to provide a fluid coupling wherein the interconnection of the coupling parts is achieved by a manually operated lever, and coupling of the parts is assisted by the hydraulic pressure within the pressurized supply circuit.

A further object of the invention is to provide a self-sealing fluid coupling utilizing standard interfaces, and wherein interconnection of the parts is hydraulically assisted.

Yet another object of the invention is to provide a "breakaway" self-sealing fluid coupling wherein the coupling parts each contain self-sealing valves, and fluid pressure within the supply part is utilized to unseat the self-sealing valve within the supplied part permitting mating and interlocking of the coupling parts regardless of the fluid pressure within the supplied circuit.

In the practice of the invention the female coupling part is connected to the supply side of the circuit utilizing a pump, while the male coupling part communicates with the supplied circuit. The coupling parts utilize standard interface configurations, and an annular sleeve mounted upon the female part utilizes radially movable balls to connect to the male part and a manually operated lever axially translates the sleeve to draw the male part into the female.

An expansible chamber motor is defined in the female coupling part communicating with the supplied pressurized fluid during part interconnection to assist in the axial displacement of the sleeve and operation of the lever.

The self-sealing valves within the female and male coupling parts engage during interconnection, and the female part includes an expansible booster motor in communication with the supplied pressure for displacing the male self-sealing valve if the pressure within the supply circuit is too great to permit the self-sealing valve to open during mechanical interconnection. This booster motor assures opening of the supplied circuit regardless of the static pressure therein.

The sleeve may be displaced by the tension within the coupling parts to provide a "breakaway" operation, and the aforementioned structure is concisely incorporated within a coupling configuration and size comparable to available couplings for similar applications.

BRIEF DESCRIPTION OF THE DRAWINGS

The aforementioned objects and advantages will be appreciated from the following description and accompanying drawings wherein:

FIG. 1 is an elevational view, partially sectioned, of a fluid coupling in accord with the invention, the male part being inserted, but unlocked, FIG. 2 is an elevational, partially sectioned view similar to FIG. 1 illustrating lever and sleeve movement sufficient to lock the male part within the female, FIG. 3 is an elevational, partially sectioned view showing the fully coupled interrelationship of the parts, but prior to opening of the male self-sealing valve, and FIG. 4 is an elevational, partially sectioned view illustrating the booster motor in its operative position opening the male self-sealing valve.

DESCRIPTION OF THE PREFERRED EMBODIMENT

With reference to the drawings, the coupling female part 10 is usually hard mounted, such as being attached to the pressurized supply circuit of a tractor or the like. The supplied circuit, such as the circuit of a farm implement, includes the male part 12 mounted upon a flexible hose 14 and connectable to the female part 10.

The female part 10 includes a passage 16 internally threaded at the left to receive a pressurized conduit from the pump, having a tubular sleeve which telescopingly supports the valve 20 which is biased toward a sealing relationship with the conical seal 22 by compression spring 24.

An annular sleeve 26 is mounted upon the coupling part 10 for axial displacement, and the sleeve includes an annular piston head 28 internally and externally grooved to receive sealing rings 32. The annular cap 34 mounted upon the part 10 forms an annular chamber 36 in which the sleeve piston head 28 reciprocates. At its right end, the sleeve 26 is provided with a cylindrical portion 38 having a plurality of radially extending circumferentially spaced holes each receiving a radially movable ball 40. A snap ring 42 defined in a groove adjacent the right end of the sleeve limits the movement of the annular ball retainer 44 on the sleeve 26 as biased to the right by the compression spring 46. The ball retainer 44 includes an annular recess 48 partially defined by an oblique cam surface, and movement of the retainer to the right is limited by engagement with the snap ring 42, or the snap ring 50 located within the annular cap 34. A flexible elastic skirt 52 prevents the entrance of foreign matter.

An operating shaft 54 is rotatably mounted upon the cap 34 within cylindrical recess 56, and the shaft includes a handle 58 pinned thereto. At its lower portion the shaft includes an eccentric pin 60 received within the annular groove 62 defined within the sleeve 26 whereby rotation of the shaft by the handle 58 will axially displace the sleeve upon the coupling part 10. Spring detent means, not shown, may be utilized to hold the shaft 54 in its open and closed rotary positions upon the cap 34.

A booster piston assembly generally indicated at 64 is located within the passage of the female part 10, and the booster piston includes a head 66 sealingly engaging the sleeve by means of an O-ring. The booster piston 64 includes an axially extending portion 68 also sealed to the sleeve and a central valve 70 is defined in the booster piston engagable with seat 74. The valve 70 is biased to the right by a compression spring 72 for engagement with seat 74 when the coupling parts are disconnected, and movement of the valve to the left is limited by compression of spring 72 against the piston spider shoulder 76. Movement of the spider to the left is limited by engagement with the snap ring 78 located within the booster piston. As will be noted, the valve 70 and seat 74 will engage when the coupling parts are separated to prevent entry of foreign matter into the female coupling part.

The male part 12 is of a conventional construction including a passage 80 internally threaded for receiving the hose fitting 82 associated with the hose 14. Externally, the part 12 includes the conventional ISO annular groove 84 for receiving the locking balls 40, and the cylindrical nose 86 sealingly engages with the sleeve supported seal 88. Internally, the part 12 is provided with a spider 90 slidably supporting the self-sealing valve 92 which is biased toward the left for engagement with the seat 94, FIG. 1, by the compression spring 96. The valve 92 includes a nose 98 extending to the left beyond the left end of the part body.

The coupling cap 34 preferably includes a pivoted cover 100 for enclosing the open end of the part 10 when the part 12 is uncoupled therefrom.

In the uncoupled state, due to the previous release of part 12, the shaft 54 will be pivoted counterclockwise to the position shown in FIG. 1, shifting the sleeve 26 to the right, engaging ball retainer 44 with snap ring 50 aligning the retainer recess 48 with the balls 40. The booster piston 64 will be located at its outer position, FIG. 4, and the central valve 70 will be engaging the seat surface 74 under the influence of the spring 72. Also, the passage 16 will be sealed by engagement of the valve 20 with the seat 22 as in FIG. 1.

To couple the part 12 to the part 10, the cover 100 is pivoted downwardly to the position of FIG. 1, and the male part 12 inserted into the open end of the sleeve 26. The balls 40 will be forced outwardly into the retainer recess 48 by nose 86 permitting the groove 84 to align with the balls and when the male nose is fully inserted into the sleeve, the components will be related as indicated in FIG. 1. Note that valve 92 has unseated valve 70.

Thereupon, the operator begins to rotate the shaft 54 in a clockwise direction, causing the eccentric pin 60 to shift the sleeve 26 to the left. This motion causes the sleeve to move under the retainer 44, FIG. 2, aligning the retainer surface 102 with the balls 40 forcing and holding the balls into a locking relationship with the groove 84. The part 12 is moved to the left by the balls and the valve 92 engaging the booster piston valve 70 compresses the spring 72 to shift the booster piston 64 to the left.

As rotation of the shaft 54 continues by rotation of the handle 58 the sleeve 26 is moved further to the left causing the valve 70 to engage the nose of the valve 20. This action will unseat the valve 20 from its seat 22, pressurizing the chamber 104 from the pressurized fluid source.

A radial orifice 106 is defined in the sleeve 26 between chamber 104 and the right side of the piston head 28, pressurizing the chamber 36 which imposes a hydraulic force upon the sleeve 26 aiding movement of the sleeve to the left. In this manner the operation of the shaft 54 is hydraulically augmented, and this hydraulic assist will exist as long as the valve 20 is unseated.

FIG. 3 represents the relationship of the components when the parts 10 and 12 have been fully coupled, and prior to shifting of the booster piston 64 to the right. At this time the sleeve 26 will be engaging the left end of the chamber 36 and the passages within body 10, and booster piston 64 are fully open.

The chamber 108 "behind" the booster piston head 66 is vented to the atmosphere by radial passage 110 formed in the sleeve, and fluid pressure acting upon the piston head will force the booster piston 64 to the right. This movement of the booster piston carries the valve 70 to the right unseating the male self-sealing valve 92 from its seat 94 to establish full flow through the coupling as illustrated in FIG. 4. This movement of the booster piston permits the female part valve 20 to return to its normal position as illustrated in FIG. 4, and the coupling is now in its operative condition.

It will be appreciated that in the operative position of of FIG. 4 the components are so related that even under high capacity fluid flow conditions the valves will not close or check, and inadvertent valve closing is prevented.

In the event that excessive axial tension to the right is applied to the coupling due to unhitching of the implement, the resultant axial force that is applied to the sleeve 26 will release the detent associated with the shaft 54, and as the crank is not "on" center with respect to the shaft movement the sleeve 26 will be pulled to the right against the fluid pressure acting on the sleeve at the piston head 28, and when the sleeve has moved to the position of FIG. 1, the retainer 44 will engage ring 50 and the balls 40 will be released permitting the coupling part 12 to be released from the part 10. This releasing action, of course, closes the valves 20, 70 and 92 to prevent fluid loss.

The hydrauloc assisting and balancing of the sleeve movement due to the sleeve piston head 28 permits the coupling of the invention to be easily operated, yet inadvertent sleeve operation is prevented. The use of the booster piston 64 to unseat the male self-sealing valve 92 insures that the coupling components will be open regardless of the initial pressure existing within the supplied circuit system and part 12, and operation of the coupling will always properly occur regardless of the pressure conditions within the supply and supplied circuits.

As appreciated from the drawings, the use of the sleeve piston and booster piston adds little bulk to the coupling and a sophisticated coupling operation is achieved within a concise configuration.

It will be appreciated that various modifications to the inventive concepts may be apparent to those skilled in the art without departing from the spirit and scope of the invention.

I claim:

1. In a fluid coupling for interconnecting pressurized fluid systems comprising, in combination, a first part having an axial passage having an inner end connected to a first fluid system and an open outer end, a second part having an axial passage having an inner end connected to a second fluid system and an outer end adapted to be received within said first part passage outer end, a tubular sleeve concentrically mounted upon said first part for axial displacement thereon between first and second positions, said sleeve having an open end located adjacent said first part's open end at said sleeve's first position and drawn into said first part at said sleeve's second position, a plurality of radially movable detents mounted on said sleeve adjacent said open end thereof, an annular detent retainer mounted on said sleeve in radial alignment with said detents axially displaceable between detent locking and detent release positions, a spring defined on said sleeve biasing said detent retainer toward said detent locking position, said second part outer end being receivable within said sleeve open end and having an annular groove defined therein for receiving said detents when said retainer is in said detent locking position, a manual actuator mounted upon said first part operatively connected to said sleeve for displacing said sleeve between said first and second positions, an expansible motor chamber defined in said first part, a piston defined on said sleeve within said motor chamber, said chamber selectively communicating with said first part first fluid system whereby the pressure thereof augments movement of said sleeve from said first position to said second position, said second part being connected to said sleeve at its first position and drawn into said first body at said sleeve's second position, a first valve within said first part passage, a second valve within said second part passage, said first valve including an annular axially reciprocal booster piston within said first part passage for axially biasing said first valve toward said second valve to open said second valve when said sleeve is in said second position and said parts are fully coupled.

2. In a fluid coupling as in claim 1, said first valve being located within said booster piston, and a spider interposed between said booster piston and first valve.

3. In a fluid coupling as in claim 1, wherein said expansible motor chamber and piston are of an annular configuration concentric to said first part passage and said manual actuator is axially located between said annular chamber and piston and said first part open end.

4. In a fluid coupling as in claim 1, detent retainer abutment means defined on said first part engagable by said detent retainer at said sleeve's first position to shift said retainer to said detent release position.

* * * * *